United States Patent [19]
Kagimasa et al.

[11] Patent Number: 5,293,599
[45] Date of Patent: Mar. 8, 1994

[54] PROCESS FOR PARTIALLY SWAPPING REAL STORAGE AREAS USED BY A PROGRAM BETWEEN A REAL STORAGE AND AN AUXILIARY STORAGE

[75] Inventors: Toyohiko Kagimasa; Kikuo Takahashi; Toshiaki Mori, all of Hachioji, Japan

[73] Assignee: Hitachi, Ltd., Tokyo, Japan

[21] Appl. No.: 416,992

[22] Filed: Oct. 4, 1989

[30] Foreign Application Priority Data

Oct. 7, 1988 [JP] Japan ................. 63-251767

[51] Int. Cl.$^5$ ................. G06F 12/00; G06F 13/00
[52] U.S. Cl. ................. 395/425; 364/DIG. 1; 364/246.11; 395/400; 395/650
[58] Field of Search ... 364/200 MS File, 900 MS File; 395/425, 400, 650

[56] References Cited

U.S. PATENT DOCUMENTS

| | | | |
|---|---|---|---|
| 4,742,447 | 5/1988 | Duvall et al. | 395/375 |
| 4,771,375 | 9/1988 | Beglin et al. | 395/425 |
| 4,805,097 | 2/1989 | De Sanna | 395/400 |
| 4,868,738 | 9/1989 | Kish et al. | 395/400 |
| 4,916,608 | 4/1990 | Shultz | 395/650 |
| 4,918,595 | 4/1990 | Kahn et al. | 395/650 |
| 4,967,353 | 10/1990 | Brenner et al. | 395/425 |

FOREIGN PATENT DOCUMENTS

0280019 8/1988 European Pat. Off. .

OTHER PUBLICATIONS

Beretuas et al, "Extended Swap Control for Paged Data", IBM TDB, vol. 25 No. 9, Feb. 1983, pp. 4529-4532.
Rosenfeld, "Information Processing", North Holland Publishing Co., Amsterdam, NL, 1974, pp. 235-241 by Opderbeck et al, "Performance of a Page Fault Frequency Replacement Algorithm in a Multiprogramming Environment".

*Primary Examiner*—Glenn Gossage
*Attorney, Agent, or Firm*—Antonelli, Terry, Stout & Kraus

[57] ABSTRACT

A process for partially swapping real storage areas used by a program is utilized in a computer system which executes programs by multiprogramming under control of a virtual storage type operating system. A first portion of a real storage area, allocated to a program to be swapped out, remains allocated to that program while the contents of a second portion of the real storage area are saved in an auxiliary storage so that the second portion is deallocated from that program. The saved contents of the second portion stored in the auxiliary storage are loaded in the real storage when the program is to be swapped in.

10 Claims, 7 Drawing Sheets

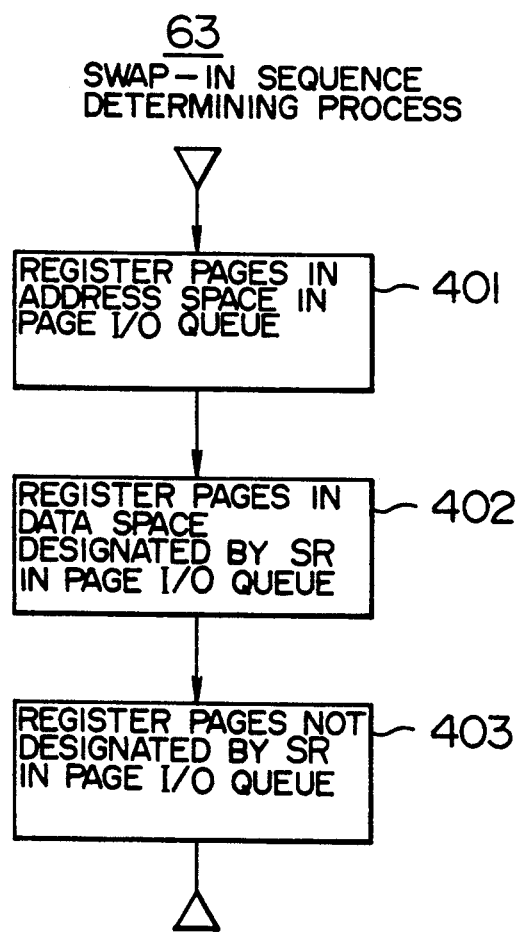

PROCESS FOR PARTIALLY SWAPPING REAL STORAGE AREAS USED BY A PROGRAM BETWEEN A REAL STORAGE AND AN AUXILIARY STORAGE

BACKGROUND OF THE INVENTION

The present invention relates to main storage management processes for a computer system using a virtual storage.

In a conventional computer using a virtual storage type operating system, a demand paging system is known as a main storage management system. More specifically, as described in HITAC Manual "VOS3/ES Center Managed -JSS3 Vol. 3-" (1987), pp. 58-80, or P. B. Hansen: "Operating System Principles", Prentice-Hall (1973), pp. 176-182 and 213-224, the main storage management system includes both paging and swapping processes.

The paging process maintains, in executable form, a job executed by a CPU while allocating to the job a real storage area which the job requires. It dynamically allocates and releases (deallocates) pages of a real storage to and from a virtual page which is a fixed length unit of a virtual storage. The time interval from the time when each of real pages allocated to a virtual page is referred to last to the current time (unreferenced time interval) is measured. When a shortage of real pages not already allocated to virtual pages occurs, the real pages are released in order of unreferenced time intervals.

The swapping process is used, on the other hand, to reserve further execution of a job under execution, to save the contents of a real storage allocated to the job in an auxiliary storage in order to release the area in the real storage (swap out), and then to load in the real storage all the saved contents when the job is recovered to a re-executable state (swap in). Paging is effected for each page in the real storage while swapping is effected for all pages which a program, for example, a job, is using.

In the conventional technique, if the capacity of the real storage area which a job to be swapped occupies is large, a quantity of transfer of data or a program deriving from swapping between the real storage and an auxiliary storage becomes large. These are overhead (unnecessary) operations for execution of programs by the computer. Therefore, a portion of time for which a central processing unit (CPU) and an input/output (I/O) device are used for purposes other than execution of programs increases in proportion to the quantity of real storage. Thus, a state is brought about that the job under execution is likely to wait for the CPU and I/O, and the processing efficiency and responsiveness of the system decreases. This state is called a slashed state. If paging is employed to solve a shortage of the real storage, paging occurs frequently because large-scaled jobs being executed compete with each other with respect to the real storage. Thus a slashed state is brought about disadvantageously as in the swapping of the large-scale job.

Japanese Patent Publication JP-A 60-54058 discloses a process for swapping a job with a reduced overhead. A swapping operation of a job which performs transactions is executed when the job completes one of the transactions and then enters into a waiting state. What is saved in the auxiliary storage is a program area (including not only an area for program instructions but also data buffer area designated by a user). The contents of work areas which the system has allocated to the program are not required for the subsequent transaction to be executed by the job, so they are not saved to the auxiliary storage but, rather, are released.

The above-mentioned prior art reduces an overhead on swapping by not saving data in work areas which are not to be used later by the job. The program area containing programs and data used later are all saved (swapped out), so the overhead due to the swapping is still large for a large scale job.

A multiple virtual storage system is also known in which each of the jobs can access a plurality of virtual storage spaces. Such a system has other problems with paging and swapping.

A computer system using such a paging type multiple virtual storage process is described, for example, in IBM Manual SA22-7200-0, "IBM Enterprise System Architecture/370 Principles of Operation", pp. 3-1 to 3-47, 5-26 to 5049 (Aug. 1988).

Specifically, as shown in FIG. 2 a virtual storage 100, a real storage 103, and an auxiliary storage 104 are each divided into units of a fixed length referred to as pages. A real page 108 and an auxiliary page 109 are allocated for each of virtual pages 106 and 107. For example, a j-th real page 108 and a k-th auxiliary page 109 are allocated to an i-th virtual page 106. The correspondence between these pages is provided by a conventional address converter (not shown). The virtual storage spaces include an address (data) space capable of accommodating both programs and data and data spaces each capable of accommodating only data. One job is capable o using one address space 101 and a plurality of data spaces 102. As shown in FIG. 3, the system includes a group of 16 space registers, designated generally by 201, which hold space identifiers, each indicative of one of virtual storage spaces to which belongs the address stored in each of a group of 16 general-purpose registers #0-#15 designated generally by 200. A reference bit storage 4 (FIG. 2) holds a reference bit corresponding to each real page, indicative of whether or not the corresponding real page has been referred to. FIG. 3 schematically shows the relationship between the contents of the group of general purpose registers 200, the group of space registers 201, and the spaces in the virtual storage. In FIG. 3, it is assumed that general purpose registers #1 and #2 have addresses in address space 101 in virtual storage 100 while general-purpose registers #3 and #15 each have addresses in one (102A or 102B) of data spaces 102 in virtual storage 100 and that the corresponding space registers #1, #2, #3 and #15 hold space identifiers o, 0, 3 and 1 of address space 101, address space 101, data space 102A and data space 102B, respectively. When a central processing unit (CPU) is taken away from the job under execution, the contents of each of the space registers 201, are saved in a space register saving area 211 in a job control table (JCT) 210 provided on real storage 103 and corresponding to the job. When the job is assigned to the CPU later on and the execution of the job is restarted, the saved data is again loaded in the group of space registers 201. The job control table 210 further includes a pair of address space identifier 214A and a real page pointer 213 indicative of the head of a list of real pages allocated to that address space, and plural pairs each of space identifier 212D of one data space and real pointer 213 indicative of the head of a list of real pages allocated to that data space. Reference numeral 214 denotes a pointer of a list of swapped-in jobs (in-job list) and a point of a list of swapped-out jobs (out-job list).

When pages allocated to a job are to be paged out in the prior art, contents of a virtual page having a longer unreferenced time interval are paged out irrespective of the virtual storage space (address space 101, data space 102) to which the job belongs. A real page allocated to a virtual page in a virtual storage space whose space identifier was stored in one of the space registers 201 often has a high probability that it will be used earlier than the real pages allocated to virtual pages in other virtual spaces among the virtual spaces used by the job.

However, if the unreferenced time for a real page having a high probability of earlier use is longer than that for a real page having a lower probability of earlier use, the former rather than the latter would undesirably be paged out.

Therefore, a paging process is desirable which reflects the degree of probability of earlier use of a real page.

Furthermore, in the above prior art, when a job is to be swapped in, real pages which were allocated to virtual pages are "swapped in" in an order of virtual spaces to which the virtual pages belong. The order of the virtual spaces is determined in accordance with a predetermined order of space identifiers. Generally, contents of the real page which were allocated to a virtual page belonging to a virtual storage whose space identifier was held in space register 201 when the job under execution directly before the job was swapped out often has a high probability that those contents will be used earlier than those of the real pages which were allocated to virtual pages in other virtual storage spaces among the virtual storage spaces the job used before.

However, in the above conventional process, if the identifier of a virtual space for a real page having a lower probability of earlier use precedes the identifier of a virtual space for a real page having a higher probability of earlier use within the predetermined order of the space identifiers, the contents of the former real page can be swapped in earlier than the contents of the latter real page. If the job is assigned the CPU and starts to be executed after start of swapping in of the job and before contents of all virtual pages in all the virtual storage spaces which were allocated to the job has been swapped in, it can occur that contents of real pages are swapped in yet correspond when a space identifier is reloaded in space register 201 for a virtual storage space to which the real pages are allocated. Thus, a fault interruption of a virtual storage occurs and execution of the job is delayed. Therefore, swapping which reflects the degree of probability of earlier use of a real page is desirable.

SUMMARY OF THE INVENTION

It is an object of the present invention to provide a main storage management method which is capable of using a main storage efficiently with low overhead under a large scale job environment.

It is a specified object of the present invention to provide a swapping method capable of reducing a quantity of pages to be swapped in and out.

It is another object of the present invention to provide a swapping method which reflects the degree of probability of earlier use of a real page.

In order to achieve the above objects, the present invention provides a main storage management method in a computer system which executes programs by multi-programming under control of a virtual storage type operating system, comprising the steps of:

(a) maintaining a first portion of a real storage area allocated to a program, within a real storage of the computer system, in a state allocated to the program when the program is to swapped out while saving the contents of a second portion of the real storage area allocated to the program in an auxiliary storage and releasing or de-allocating the second portion from the program; and (b) loading the saved contents of the second portion from the auxiliary storage into the real storage when the first program is to be swapped in later on.

Also, the present invention provides a real storage management process in a computer system controlled by a virtual storage type operating system to execute programs, by multiprogramming, and which operating system uses a plurality of virtual storage spaces, wherein the computer system includes a plurality of space registers each of which holds an identifier for one of virtual spaces which an instruction of a program under execution is using, comprising the steps of:

(a) when an area within a real storage of the computer system, allocated to a program to be swapped out is to be deallocated from the program, preferentially deallocating a first area in the real storage of the computer system, allocated to a virtual area which belongs to a virtual space designated by a space identifier which was set in one of the plurality of space registers when the program was being executed by the computer system, then deallocating second areas in the real storage of the computer system, allocated to virtual areas belonging to other virtual spaces which the program uses, and (b) allocating the deallocated first area to another program.

BRIEF DESCRIPTION OF THE DRAWINGS

FIG. 7 is a flowchart of a swapping-in sequence determining process 63 in FIG. 4.

DESCRIPTION OF THE PREFERRED EMBODIMENT

Figure 2:
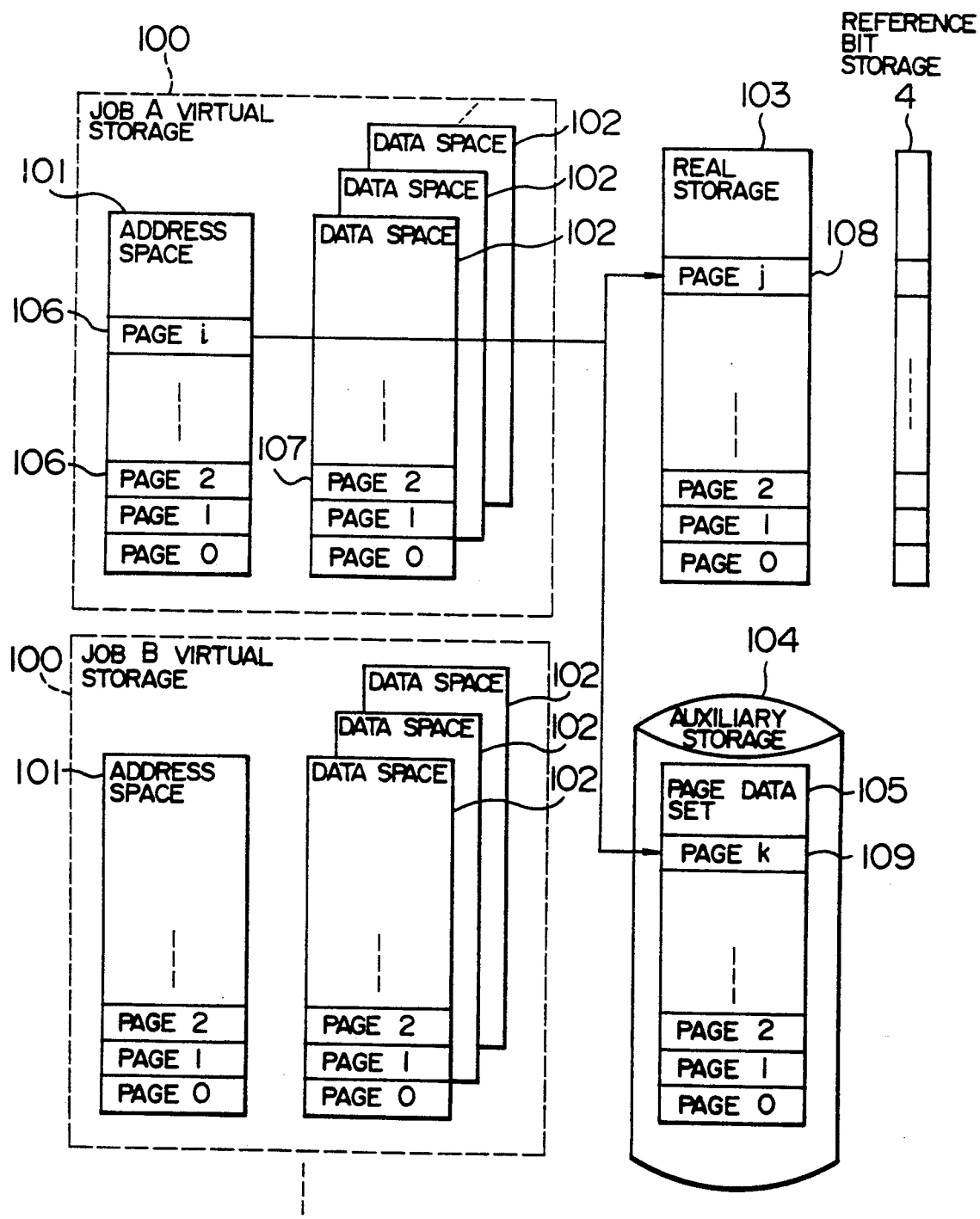
FIG. 2 is a schematic of a conventional virtual storage in a multi-virtual space.
Figure 3:
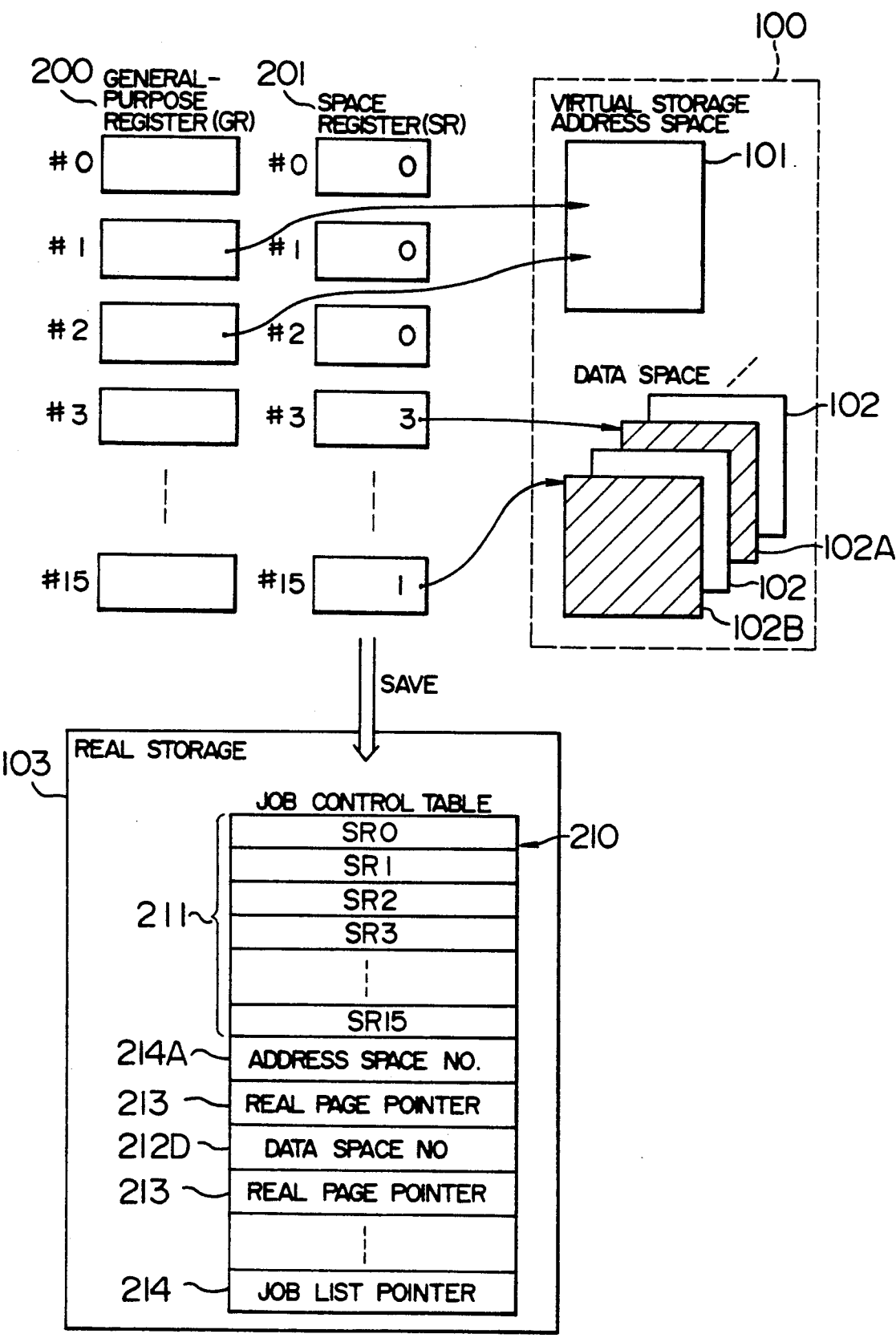
FIG. 3 illustrates a group of registers of a computer system used in the virtual storage of FIG. 2.

An embodiment of the present invention will be described which is directed to a computer using a multi-virtual storage type operating system employed in IBM's Enterprise System Architecture/370 described with respect to FIGS. 2 and 3. The system of FIGS. 2 and 3 is used in the embodiment by additionally including an AF flag, to be described later in more detail, in the job control table of FIG. 3. Therefore, the embodiment of the present invention will also be described by referring to FIGS. 2 and 3.

Figure 1:
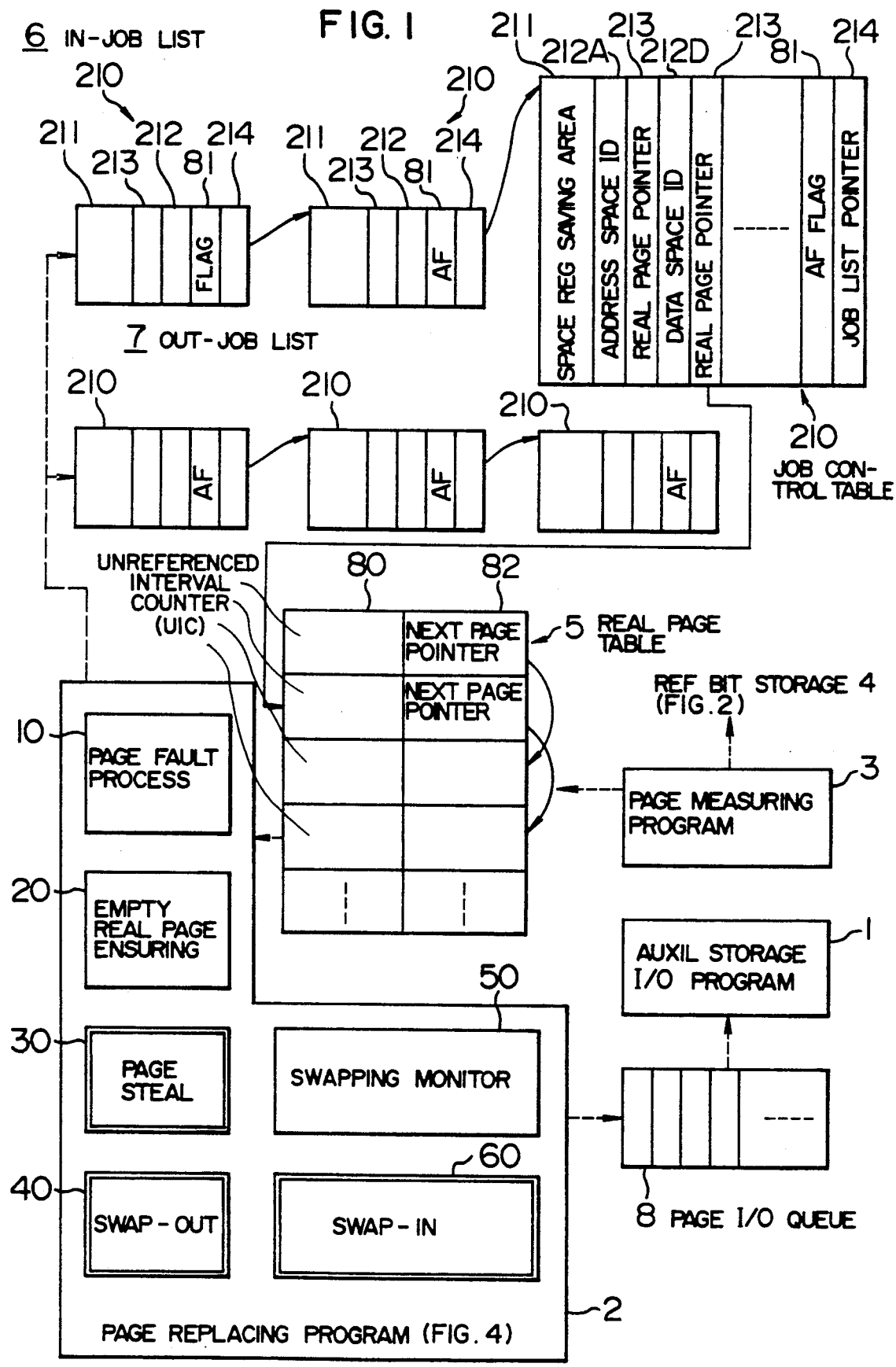
FIG. 1 is a schematic of the essential portion of one embodiment of an operating system according to the present invention.

FIG. 1 shows a program associated with storage management and the essential portion of a table which are each provided in a particular area (not shown) in real storage 103 (FIG. 2).

Reference numeral 1 denotes an auxiliary storage I/O program; 2, a page replacing program; and 3, a page measuring program. The elements 1 and 3 are well-known. Reference numeral 5 denotes a real page table having entries, each corresponding to a real page; 6, an in-job list which has a chain of job control tables 210 each for a swapped-in job; 7, an out-job list which has a chain of job control tables 210 each for a swapped-out state; and 8, a page I/O queue, having in an auxiliary storage I/O program 1 an entry which holds an I/O request for each page to auxiliary storage 104 (FIG. 2). Each of entries in real page table 5 includes an unreferenced interval counter 80 (UIC) which is an index indicative of a ratio of a time interval during which a page corresponding to the entry has not been referred to against the CPU time which a job which uses the page has consumed, and a pointer 82 indicative of an entry for the next real page used by the-job, within the real page table 5. The table 5 is also well-known. Each job control table 210 has an AF flag which is set to 1 when a job corresponding to that table 40 is swapped out by adaptive swapping which is one of the features of the present invention. A job list pointer 214 in each job control table 210 of either in-job list 6 or out-job list 7 has the address of a next job control table 210 within either in-job list 6 or out-job list 7, respectively. A real page pointer 213 in each job control table 210 indicates the address of one of the entries in real page table 5 for real pages allocated to a virtual storage space used by the job to which the job control table 210 corresponds. The next page pointer 82 in this entry of the real page table 5 points to another entry in the table 5, for another real page allocated already to the same job. Therefore, real pages allocated to a space which is being used by a job can be found by a real page pointer 213 in a job control table 210 corresponding to the job pointer 212. A dispatcher (not shown), which is a well known program of the operating system, assigns the CPU to a job to be executed selected among a group of jobs corresponding to the job control tables 210 in in-job list 6. A group of jobs corresponding to the job control tables 210 in out-job list 7 is not selected by the dispatcher unless the job control table 210 of the job is associated with in-job list 6.

Page measuring program 3 refers to reference bit storage 4 (FIG. 2) at predetermined time intervals to update unreferenced interval counter 80 for each real page in real page table 5. If reference bit storage 4 for a real page is set, the corresponding unreferenced interval counter 80 for the real page is cleared to 0 and when it is not set, the counter 80 is incremented by one. Such technique is well known and further detailed description thereof will be omitted. When a job accesses a virtual page to which is paged out, the operating system generates a page fault interruption. Page replacing program 2 allocates an empty real page in response to page fault interruption. If a total amount of empty pages are not enough, it renders empty real pages allocated to a job by paging out or swapping out operations. Saving of the contents of those real pages into auxiliary storage 104 (FIG. 2) are effected in such a manner that page replacing program 2 registers a page I/O request for each of the real pages in page I/O queue 8 and that auxiliary storage I/O program 1 takes the requests from page I/O queue 8 sequentially, to start the I/O operation for those requests. Processing auxiliary storage I/O program 1 is well known and detailed description thereof will be omitted. The saved contents are loaded into real storage 103 (FIG. 2) later on by paging in or swapping in operations. This loading is executed in a similar manner to the saving.

Page replacing program 2 includes a page fault processing routine 10, an empty real page ensuring routine 20, a page steal routine 30, a swap-out routine 40, a swapping monitor routine 50, and a swap-in routine 60. Adaptive swapping which is one feature of the particular embodiment does not swap out all of the real pages allocated to a job to be swapped out in the auxiliary storage 104 (FIG. 2) unlike the conventional swapping out, but swaps only a limited number of real pages. The number is the difference between the total number of real pages allocated to the job to be swapped out and the target number of empty real pages to be obtained to be available for swapping out.

In page steal routine 30 or swap-out routine 40, a real page having a low probability of earlier use is preferentially saved in auxiliary storage 104 (FIG. 2). Conversely, in swap-in routine 60, a page having a higher probability of earlier use is preferentially loaded from auxiliary storage 104 onto real storage 103. This is the second feature of the present invention.

The processes performed by the respective routines of FIG. 4 will now be described.

(1) Page Fault Processing Routine 10

Figure 4:
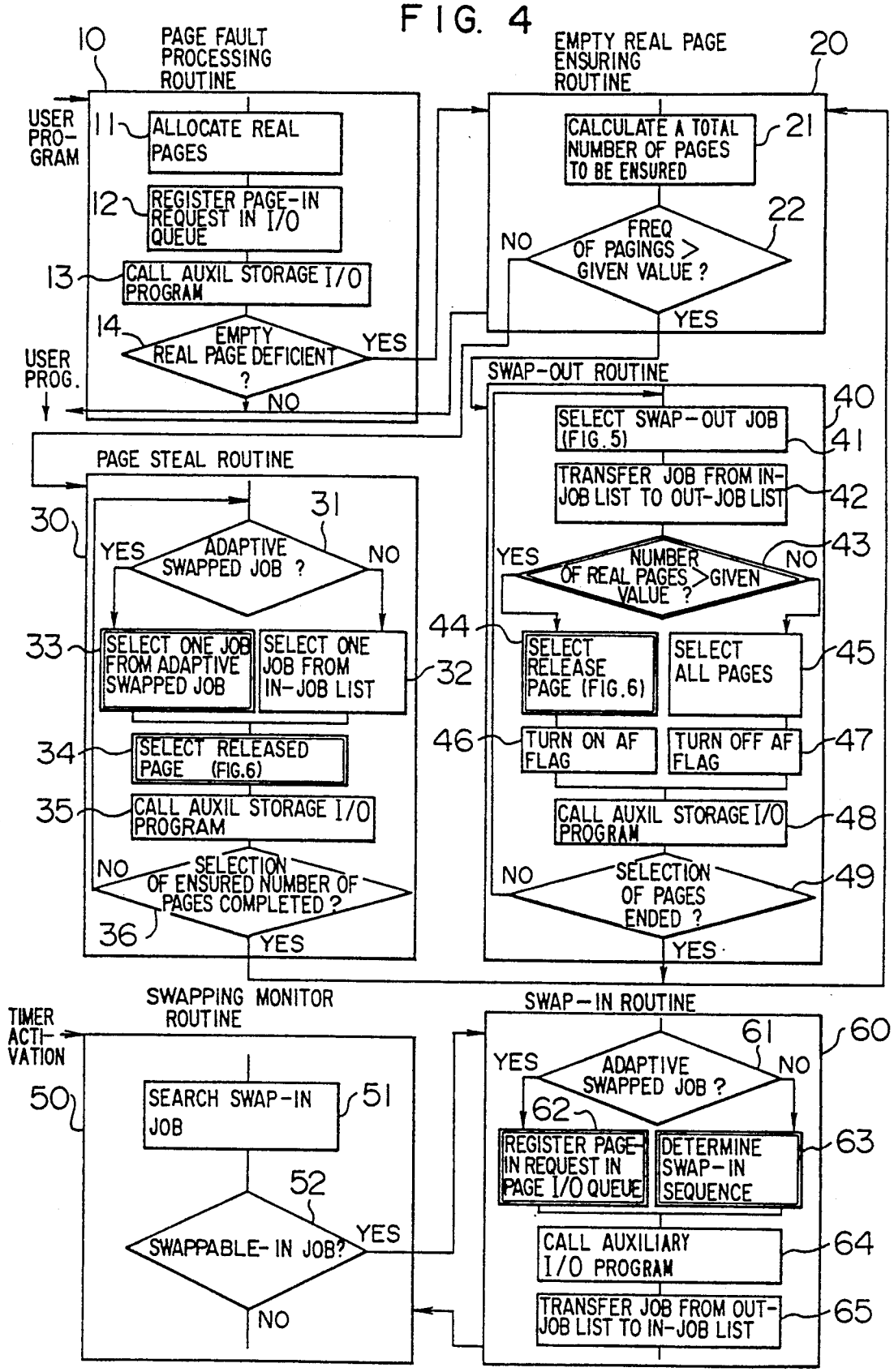
FIG. 4 is a flowchart of a page replacing process of FIG. 1.

In FIG. 4, when a virtual page within a virtual storage is accessed according to user program, an interruption of a page fault is generated by a well known address converter (not shown) unless a real page is allocated to the virtual page and thus control passes to page fault processing routine 10, which may be a conventional one. In this routine, one empty real page (that is, a real page not allocated to any virtual page) is newly allocated to the virtual page (step 11). A paging request to input an auxiliary page allocated to the virtual page from the auxiliary storage 104 to the newly allocated real page is registered in page I/O queue 8 (step 12). Auxiliary storage I/O program 1 is called (step 13). As a result if the total number of remaining empty real pages is less than a target number of empty real pages, determined separately by the system on the basis of storage capacity of real storage 103, empty real page ensuring routine 20 is started. If otherwise, control returns to the user program (step 14).

(2) Empty Real Page Ensuring Routine 20

Empty real page ensuring routine 20 may be a well known one and is used to calculate the total number of empty pages required by the system (step 21). The total number of empty real pages required is the sum of the target number of empty real pages and a predetermined number of additional or margin empty real pages. If the frequency of paging operations currently occurring in the system is higher than a given value, swapping is selected to ensure the required empty real pages and swap-out routine 40 is called. If paging frequency is lower, page steal routine 30 is selected so as to ensure the required empty real pages (step 22).

(3) Page Steal Routine 30

If page steal routine 30 is called in empty real page ensuring routine 20, it first determines whether there is any adaptively swapped-out job within jobs registered in out-job list 7 (step 31). Such a job an AF flag which is on, in a job control table 210 for the job. Since the adaptively swapped-out job is not executed for the time being, it is advantageous to use the real pages allocated to that job for ensuring additional empty real pages. This is one of the features of the page steal routine 30 in the particular embodiment. If such jobs are found in Step 31, one of such jobs is selected as a job for which the page steal is to be executed (step 33). If there is no adaptive swapped-out job, one job in the in-job list 6 is selected (step 32). if there are a plurality of jobs in in-job list 6, one of them is selected randomly, for example, using a random number. Thereafter, a plurality of real pages selected are released or deallocated from the job among the real pages allocated to the job selected at step 32 or step 33 (step 34), as will be described in detail later on with respect to FIG. 6. In order to output data on those selected real pages to auxiliary storage 104, auxiliary storage I/O program 1 is called (step 35). It is determined whether the total number of empty real pages assured so far has amounted to the total number of required empty real pages (step 36). If not, control returns to step 31 to perform the same processing on the next job registered in the in-job list 6 (steps 31-35). If so, control returns to empty real page ensuring routine 20.

Figure 6:
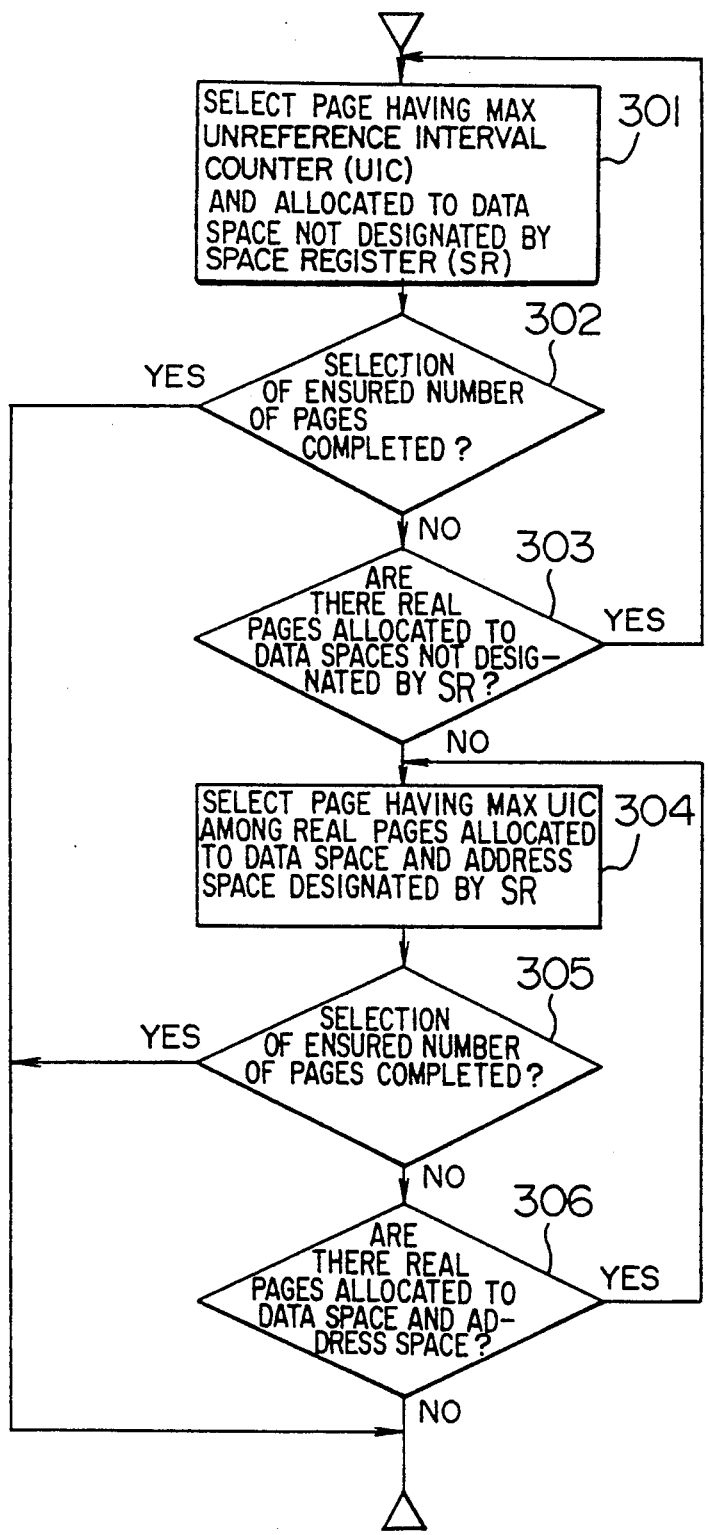
FIG. 6 is a flowchart of a released page selecting process 34 or 44 in FIG. 4.

In the page selecting process 34, page selection is effected for the job selected at step 32 or 33 in the method illustrated in FIG. 6. A real page having the maximum unreferenced interval counter (UIC) value is selected, as one to be released, among the real pages allocated to the virtual pages in data space 102 used by the job but no designated by any of the group of space registers (SR) 201 saved in an area 211 (FIG. 1) in job control table 210 of the job, registered in either out-job list 7 or in in-job list 6 (step 301). Since a program of the job is allocated to the address space which the job uses, the real pages allocated to the group of data spaces which the job uses has a lower probability of earlier use than real pages allocated to the address space which the job uses. The real pages allocated to one or plural data spaces 102 designated by the group of space registers save in the area 211 has a higher probability of earlier use than the real pages allocated to the one or plural data spaces other than the designated one or plural data spaces 102. Preferential selection (for release) of such a real page having a lower probability of earlier use is another feature of page steal routine 30 in the particular embodiment. The search of such a real page is effected by a tracing a chain of entries in the real page table 5 pointed to by real page pointer 213 (FIG. 1) provided in correspondence to the one of data space identifiers 212D registered in job control table 210 for the job and having no value in saving area 211 and by finding an entry which has the maximum value of unreferenced interval counter (UIC) among those entries. If selection of real pages to be ensured is completed, the processing ends (step 302). If not, the next real page is searched by tracing the same chain of entries in the same real page table 5 and by finding real pages allocated to a data space used by the job but not designated by the space registers saved in the area 211 of the job control table 210 of the same job (step 303). If such real pages are found, control returns to step 301 to select one of those real pages which has the maximum value of unreferenced interval counter (UIC), and, if not, a real page having the maximum UIC value is selected, as one to be released, among the real pages allocated to the address space 101 and data space 102 designated by the group of space registers 201 saved in the real page tables 5 for those spaces (step 304). If selection of real pages to be ensured is completed, the processing ends (step 305). If not, other real pages are searched by tracing the chain of entries in real page table 5 (step 306) for those spaces. If they are found, control returns to step 304 whereas, if not, the processing ends.

(4) Swap-Out Routine 40

Figure 5:
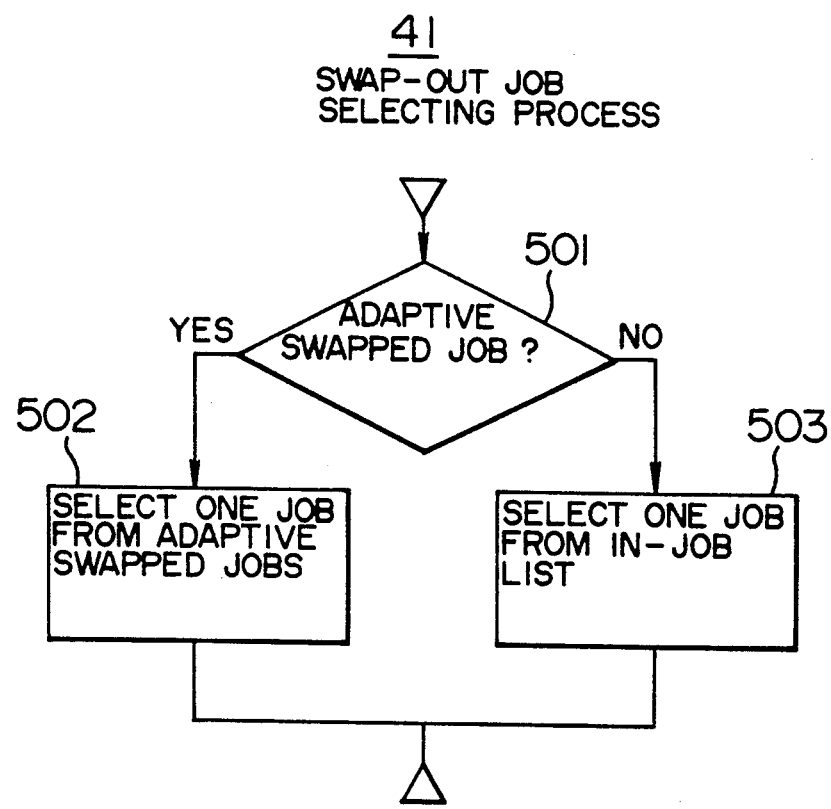
FIG. 5 is a flowchart of a swapping-out job selecting process 41 in FIG. 4.

When swap-out routine 40 is called by empty real page ensuring routine 20, it selects one job to be swapped out (step 41). In this selection process 41, as shown in FIG. 5, it is first determined from the value of AF flag 81 in job control table 210 for each job registered in the out-job list 7 whether each job in out-job list 7 is adaptively swapped-out (step 501). If adaptively swapped-out ones are found, one of them is selected (step 502). Since the adaptively swapped out jobs are not executed for the time being, release of the real pages allocated to those jobs is appropriate for effective use of the real storage, which is one feature of the swap-out routine 40 in the particular embodiment. If there are no adaptively swapped-out jobs, one job is selected among jobs having job control tables 210 in in-job list 6 (swapped in at present) (step 503). If the job to be swapped out has been selected, control returns to the step 42 of FIG. 4. The job control table 210 for the selected job is transferred from in-job list 6 to out-job list 6 (step 42) and it is determined whether the number of real pages allocated to the job is larger than a given value (step 43). If so, the job is determined as one to be swapped-out adaptively, and only part of real pages allocated to the job is selected as one to be released in a method illustrated in FIG. 6 (step 44), which is another feature of the particular embodiment. Thereafter, AF flag 81 of job control table 210 for the job is turned on (step 46). If the number of real pages allocated to the job has been judged to be not larger than the given value in the step 43, the job is determined as one to be swapped out non-adaptively, all the pages allocated to the job are selected as ones to be released (step 45) and AF flag 81 of the job control table 210 for the job is turned off (step 47). In order to start swap-out of the real pages selected in the step 44 or 45, auxiliary I/O program 1 is called (step 48). It is determined whether the total number of real pages released so far has amounted to a number of real pages to be ensured (step 49). If not, control returns to step 41 to perform the same processes 41-48. If the total number of real pages released so far has amounted to the total number of pages, control returns to empty real page ensuring routine 20.

(5) Swapping Monitor Routine 50

This routine is started at given time intervals by a timer (not shown) to search a job which can be swapped in, based upon both the status of the system operation and the status of use of resources by the jobs under execution (step 51). For example, if there are a large number of empty real pages because a job under execution (a job having job control table 210 in the in-job list 6) ended, one of jobs each having job control table 210 in out-job list 7 for the longest time is searched as one which can be swapped in. If there is a swappable-in job, swap-in routine 60 is called (step 52).

(6) Swap-In Routine 60

This routine determines from the value of AF flag 81 for the searched swappable-in job whether the job is an adaptively swapped-out one (step 61). If so, a page-in request for pages saved at a time of swapping-out of the job is registered in page I/O queue 8 (FIG. 2) (step 62). If not, the swap-in sequence is determined in a process to be described in detail later in FIG. 7 (step 63). In order to start the swap-in I/O operation registered at either of steps 62 and 63, auxiliary storage I/O program 1 is called (step 64), and job control table 210 for the job is transferred from out-job list 7 to in-job list 6 (step 65). Therefore, the job may start immediately after it is assigned to the CPU. Auxiliary storage I/O program 1 starts the I/O operation for auxiliary storage 104, so the execution of the job and the operation of auxiliary storage I/O operation may be performed in a parallel manner. In other words, it occurs that the job starts before all pages required by the job are swapped in. Thus, the sequence of swapping in the auxiliary pages required by the job is important. In the above swap-in sequence determining process 63, as shown in FIG. 7, the sequence is determined as follows. First, the I/O request for the auxiliary pages corresponding to real pages previously allocated to the address space previously used by the job to be swapped in is registered in page I/O queue 8 (step 401) because these auxiliary pages hold a program of the job, and they have the highest probability of earlier use. Secondly, the I/O request for auxiliary pages corresponding to the real pages previously allocated to the group of data spaces 102 designated by space registers 211 (FIG. 3) saved in the job control table 210 of the job is registered in page I/O queue 8 (step 402). Finally, the I/O request for the auxiliary pages corresponding to the real pages previously allocated to the group of data spaces 102 not designated by the group of space registers 211 but used by the job is registered in page I/O queue 8 (step 403) because these real pages have the lowest probability of earlier use.

As will be obvious from the above, according to the present invention, a portion of the real pages allocated to a job can be released at swapping out of the job, so that the amount of data saved in the auxiliary storage can be small, and therefore the deficiency of real storage can be eliminated with low overhead. The real storage is effectively used without release of an excessive quantity of the real storage area, so that the processing efficiency and responsiveness of the system are improved.

We claim:

1. A main storage management method for a computer system which executes programs by multiprogramming under control of a virtual storage type operating system, said method comprising the steps of:
   (a) maintaining a first portion of a real storage area allocated to one of the programs within a real storage of the computer system in a state allocated to the program when the program is to be swapped-out, while saving contents of a second portion of the real storage area allocated to the program to be swapped into an auxiliary storage thereby deallocating the second portion from the program to be swapped; and
   (b) loading saved contents of the second portion from the auxiliary storage to the real storage of the computer system when the program is to be swapped-in.

2. A main storage management method according to claim 1, further comprising a step of determining, before execution of step (a), a quantity of the second portion from a target quantity determined by the computer system regarding a non-allocated area to be maintained with the real storage of the computer system, wherein the non-allocated area is an area not allocated by any program.

3. A main storage management method according to claim 1, wherein the step (a) includes selecting, as the second portion, a portion of the real storage area which is allocated to the program to be swapped and which has not been referred to for a longer time than other portions of the real storage area allocated to the program to be swapped.

4. A main storage management method according to claim 1, further including preferentially deallocating an area of the first portion from the program then deallocating areas in the real storage of the computer system which are allocated to programs in a swapped-in state, after the step (a), to provide a new non-allocated area.

5. A main storage management method according to claim 1, wherein the step (a) includes selecting, as the second portion, a portion of the real storage area which is allocated to the program to be swapped and which has a probability that it will be used by the program later than other portions of the real storage area allocated to the program to be swapped-out.

6. A main storage management method according to claim 5, wherein the computer system includes a plurality of space registers each of which holds an identifier for one of a plurality of virtual spaces which an instruction of a program under execution is using, and wherein the step (a) includes a step of selecting, as the second portion, an area allocated to a virtual area belonging to a virtual space designated by a same identifier which was not stored in any of the plurality of space registers when the program to be swapped was being executed by the computer system before the program is swapped-out.

7. A main storage management method according to claim 1, wherein the step (b) includes a step of loading a portion of the saved contents of the second portion into the real storage of the computer system which has a probability that it will be used by the program earlier than other potions of the saved contents of the second portion.

8. A main storage management method according to claim 7, wherein the computer system includes a plurality of space registers each of which holds an identifier for one of a plurality of virtual spaces which an instruction of a program under execution is using, and wherein the step (b) includes a step of loading an area allocated to a virtual area belonging to a virtual space designated by a virtual space identifier which was set in one of the plurality of space registers when the program to be swapped was being executed by the computer system before the program is swapped-out.

9. A real storage management method for a computer system controlled by a virtual storage type operating system to execute programs by multiprogramming, and which operating system uses a plurality of virtual storage spaces, wherein the computer system includes a plurality of space registers each of which holds an identifier for one of the plurality of virtual spaces which an instruction of one of the programs under execution is using, the method comprising the steps of:
   (a) when an area in a real storage of the computer system allocated to a program is to be deallocated from the program to provide a new non-allocated area, deallocating a first area in the real storage allocated to a virtual area which belongs to a virtual space designated by a space identifier which was not stored in any of the plurality of space registers, then deallocating other areas of the real storage of the computer system; and
   (b) allocating the deallocated first area to another program.

10. A real storage management method in a computer system controlled by a virtual storage type operating system to execute programs by multiprogramming and which operating system uses a plurality of virtual storage spaces, wherein the computer system includes a plurality of space registers each of which holds an identifier for one of the plurality of virtual spaces which an instruction of one of the programs under execution is using, comprising the steps of:

(a) when a program being executed by the computer system is to be swapped-out, contents of an area in a real storage of the computer system, allocated to a virtual area in a plurality of virtual spaces which the program to be swapped uses, are saved in an auxiliary storage and there is effected a deallocating of the area from the program to be swapped-out; and (b) when the program is to be swapped-in, allocating a first area in the real storage of the computer system, to a firs virtual area of one of a plurality of virtual spaces which the program uses, the one virtual space being designated by a space identifier which was stored in one of the plurality of space registers when the program was being executed by the computer system before the program was swapped out, then allocating second areas in the real storage of the computer system to second virtual areas belonging to other of the virtual spaces used by the program than the one virtual space, and loading a first portion of the saved contents corresponding to the first virtual area from the auxiliary storage into the real storage of the computer system.

* * * * *